Feb. 12, 1929.  G. S. CLARK  1,701,608
BOTTLE HOLDER
Filed Jan. 18, 1928
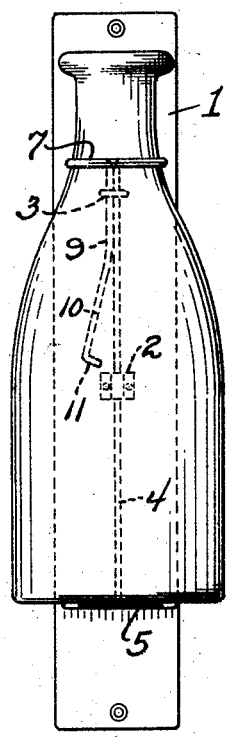
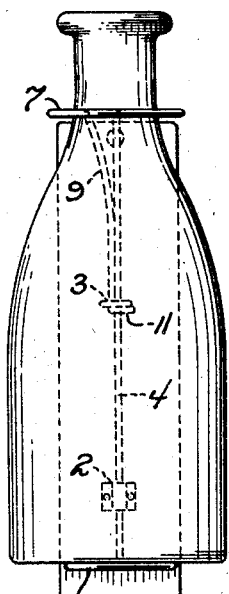
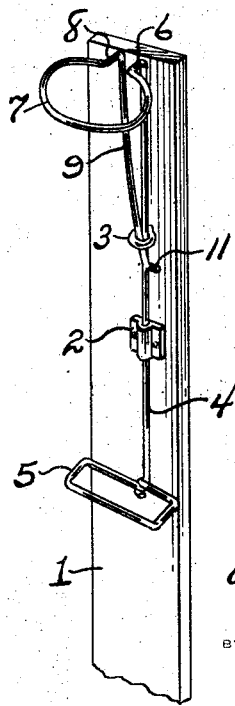
George S. Clark
INVENTOR
BY Victor J. Evans
ATTORNEY
WITNESS:

Patented Feb. 12, 1929.

1,701,608

UNITED STATES PATENT OFFICE.

GEORGE S. CLARK, OF HUNTINGTON, WEST VIRGINIA.

BOTTLE HOLDER.

Application filed January 18, 1928. Serial No. 247,641.

My present invention has reference to a means for gripping and supporting a milk bottle in a vertical position and at an elevation over a jamb of a door, a post, the side of a building or any other place convenient for the reception of milk contained in bottles and delivered by a milkman.

A further object is the provision of a device for this purpose which is vertically supported and longitudinally movable and which, when moved in one direction, will receive a milk bottle, and when moved in a second direction will effectively grip and support the milk bottle.

More specifically the improvement resides in the construction and arrangement of a wire member that is bent upon itself at one end to form a base and which at a point away from its second end is rounded upon itself and the terminal of the rounded portion is extended to provide an arm, the wire member proper and the arm being movable through an eye or the like that is fixed on the outer face of the support, and whereby, when the member is moved upwardly the rounded portion thereof will spread to provide an open jaw for the reception of the neck portion of a milk bottle therethrough, the bottom of the milk bottle resting upon the supporting portion at the lower end of the wire, and either a pressure is exerted upon the bottle or the weight thereof may be sufficient to move the wire member downwardly to cause the arm in its passage through the eye to compress the jaw portion of the improvement to cause the latter to effectively grip with the neck of the bottle.

In the drawings:

Figure 1 is an elevation showing a milk bottle supported in accordance with this invention.

Figure 2 is a similar view showing the device moved to automatically open jaw portion thereof to receive the milk bottle through the jaw.

Figure 3 is a perspective view of the improvement per se.

In the showing of the drawings I illustrate a substantially rectangular support 1. This support may be attached to a door jamb, post or side of a building most convenient for the reception of milk which is delivered in bottles. In this connection it should be stated that empty bottles may be supported by the improvement and removed by the milkman when being replaced by bottles filled with milk. Also as will be obvious as the description progresses, the employment of the plate or board 1 may be dispensed with and the improvement attached directly to a door jamb, post or the like.

On the outer face of the support 1 there is a guide 2, and above this guide there is a second guide preferably in the nature of a screw eye 3. As a matter-of-fact, the element 2 may be also in the nature of a screw eye as it is one of the purposes of this invention to produce a device which may be cheaply constructed although of a thoroughly efficient nature.

The improvement is, preferably, but not necessarily wholly constructed of wire. The main strand 4 of the wire passes through the guides 2 and 3. One end of the wire is bent upon itself to form the same with a right-angularly arranged substantially rectangular base 5. The strand 4, at a distance from its second end is bent outwardly in the same direction as the base, as indicated by the numeral 6, and the end of this portion 6 is rounded upon itself, as at 7. The rounded portion provides the jaw gripping element of the improvement. The rounded jaw 7 merges into an inwardly directed portion 8, and this portion 8 is formed at its said end, with an extension that I shall term an arm 9. The portion of the arm directly connected with the end 8 of the jaw 7 is straight, but the arm at approximately the center thereof is bent to provide an angle portion 10 which is directed away from the straight portion thereof and from the main strand 4 of the improvement. The arm passes through the guide eye 3, and the extremity of the bent or angle portion 10 of the arm is bent inwardly, as at 11, to provide a stop which contacts with the guide 3 and limits the bodily movement of the improvement through the guides when the device is moved in an upward direction to cause the angle portion 10 of the arm to contact with the guide 3 and to be influenced by such contact to spread or open the jaws 7. When the device is thus elevated on the support 1 and the jaw 7 is spread or opened the neck of a milk bottle 12 may be readily inserted through the jaw. The bottom of the milk bottle rests on the supporting base 5 of the improvement. The milk bottle and improvement are bodily moved downwardly on the support and such movement brings the straight portion 9 of the arm extension of the jaw through the guide 3 which forces the said portion 9 of the arm against the strand 4 and compresses the jaw 7, bringing the same into gripping engagement with the neck of the milk bottle. This movement may be obtained by the weight of the contents of the bottle.

The simplicity and advantages of the construction will, it is thought, be perfectly apparent to those skilled in the art to which such invention relates, when the foregoing description has been carefully read in connection with the accompanying drawings so that further detailed description will not be required.

Having described the invention, I claim:

1. A milk bottle holder comprising, a support, guides thereon, a member movable through the guides, said member having a rectangular projection forming a base on the lower end thereof, and having a loop member providing a split jaw on the second end thereof, said jaw merging into an arm whose lower end is offset and which is received through the upper guide and contacts therewith, as and for the purpose set forth.

2. A milk bottle holder comprising, a support, guides on the outer face thereof, a wire member passing through the guides, said wire member having one of its ends bent outwardly to form a substantially rectangular base, said wire having its opposite end formed with a loop extending in the same direction as the base, said loop having its end formed with an arm that passes through the upper guides, and said arm having its lower portion disposed at an outward angle which merges into an inwardly directed portion that forms a stop when the member is moved through the guides and the said offset portion contacts with the upper guide, as and for the purpose set forth.

In testimony whereof I affix my signature.

GEORGE S. CLARK.